United States Patent [19]
Umida

[11] Patent Number: 5,608,302
[45] Date of Patent: Mar. 4, 1997

[54] APPARATUS FOR DRIVING AN AC MOTOR AT VARIABLE SPEEDS

[75] Inventor: Hidetoshi Umida, Tokyo, Japan

[73] Assignee: Fuji Electric Co., Ltd., Tokyo, Japan

[21] Appl. No.: 312,601

[22] Filed: Sep. 27, 1994

[30] Foreign Application Priority Data

Sep. 28, 1993 [JP] Japan ................................ 5-264182

[51] Int. Cl.$^6$ ........................................................ H02P 5/34
[52] U.S. Cl. ............................ 318/802; 318/800; 318/804; 318/808; 318/723
[58] Field of Search ...................... 318/800–802, 318/799, 803, 804, 805, 807, 808, 809, 723

[56] References Cited

U.S. PATENT DOCUMENTS

| | | | |
|---|---|---|---|
| 4,361,791 | 11/1982 | Plunkett | 318/808 |
| 4,394,610 | 7/1983 | Dolland | 318/803 |
| 4,399,395 | 8/1983 | Espelage | 318/803 |
| 4,555,755 | 11/1985 | Kurosawa et al. | 318/807 |
| 4,585,983 | 4/1986 | Cooper et al. | 318/723 |
| 4,825,132 | 4/1989 | Gritter | 318/811 |
| 5,254,926 | 10/1993 | Miller et al. | 318/798 |
| 5,329,217 | 7/1994 | Kerkman et al. | 318/811 |

FOREIGN PATENT DOCUMENTS

| | | |
|---|---|---|
| 0119583 | 9/1984 | European Pat. Off. . |
| 0436138 | 7/1991 | European Pat. Off. . |
| 0490024 | 6/1992 | European Pat. Off. . |
| 60-121982 | 6/1985 | Japan . |

OTHER PUBLICATIONS

"An Effective Method for Rotor Resistance Identification for High–Performance Induction Motor Vector Control" by Chan et al.; IEEE Transactions on Industrial Electronics and Control, vol. 37, No. 6, Dec. 1990, pp. 477–482, XP179409.

*Primary Examiner*—John W. Cabeca
*Attorney, Agent, or Firm*—Brumbaugh, Graves, Donohue & Raymond

[57] ABSTRACT

An apparatus for driving an AC motor at variable speeds facilitates arbitrary setting or adjustment of equivalent primary resistance of an AC motor. In one embodiment of the present invention, a reference AC voltage generator outputs reference AC voltage values for each phase of the AC motor, and signals derived from the reference voltage values are in turn used by a power converter to supply the AC motor with variable voltage and frequency. In this embodiment, two or more phase currents are fed back to, and subtracted from, the reference voltage values via a regulator. In another embodiment, an angular-frequency/biaxial-reference-voltage value generator generates a reference primary angular frequency value and biaxial reference voltage values of the AC motor in a rotating orthogonal coordinate system. In this embodiment, two or more of the AC motor's phase currents are fed back to, and subtracted from, the biaxial reference voltage values via a vector transformer and a regulator. The present invention not only avoids power loss associated with using resistors, but it also obviates manual, apparatus-by-apparatus adjustment of reference AC voltage values used to drive a given AC motor.

19 Claims, 12 Drawing Sheets

APPARATUS FOR DRIVING AN AC MOTOR AT VARIABLE SPEEDS

BACKGROUND OF THE INVENTION

The present invention relates to an apparatus for driving an AC motor at variable speeds, and more particularly to an apparatus for driving an AC motor at variable speeds which controls primary resistance and/or leakage inductance of the AC motor at the desired values.

As seen in FIG. 13, a block diagram of a prior art variable-speed driving apparatus, an AC motor such as an induction motor or a synchronous motor is designated 101, a power converter such as an inverter is designated 102, and a reference AC voltage value generator is designated 103. The reference AC voltage value generator 103 generates unique reference frequency and amplitude values of AC voltage supplied to the AC motor 101 via the power converter 102. This variable-speed driving apparatus drives the AC motor at variable speeds by employing the power converter as a variable-voltage and variable-frequency power supply. In FIG. 13, symbols $v_{1a}^*$, $v_{1b}^*$, and $v_{1c}^*$ designate reference primary voltage values of three phases (a phase, b phase and c phase) of the AC motor 101, and symbols $v_{1a}$, $v_{1b}$, and $v_{1c}$ designate detected primary phase voltage values.

In the prior art apparatus shown in FIG. 13, the reference frequency and amplitude values generated from the reference AC voltage value generator 103 must be manually adjusted for each individual AC motor in order to stably drive a given motor, since optimum reference frequency and amplitude values differ depending on primary resistance of the AC motor attributable to resistance of a stator, wiring resistance of the AC motor 101, and leakage inductance. This requirement for manual adjustment is very burdensome due to complexity of relationship between the primary resistance or the leakage inductance and adjustment factors.

It is an object of the present invention to provide an apparatus for stably driving an AC motor at variable speeds.

It is another object of the present invention to provide an apparatus for stably driving an AC motor at variable speeds which does not require manual adjustments for each individual AC motor.

It is yet another object of the present invention to provide an apparatus for stably driving an AC motor at variable speeds which electrically adjusts equivalent primary resistance and leakage inductance of the AC motor to desired values.

SUMMARY OF THE INVENTION

The objects of the present invention are achieved by providing a first embodiment of the apparatus for driving an AC motor at variable speeds, in which embodiment the equivalent primary resistance of the AC motor can be arbitrarily adjusted. This present invention not only avoids power loss associated with using resistors, but it also obviates manual, apparatus-by-apparatus adjustment of the reference AC voltage values for a given AC motor. One embodiment incorporates a means for generating reference voltage values defined by frequency and amplitude, a power converter for supplying the motor with AC voltage of variable amplitude and variable frequency based on the reference voltage values, a plurality of current detectors electrically coupled to output side of the power converter, a regulator having as its input signals a set of output signals generated by the current detectors, and a means for subtracting output signals of the regulator from the reference voltage values. The power converter receives results of the subtraction as its input and generates the final reference primary phase voltage values for driving the AC motor.

By appropriately setting the gain of amplifiers incorporated in the first embodiment of the variable-speed driving apparatus, more efficient variable-speed driving of the AC motor is realized in the face of variations in sum of the primary resistance of the AC motor, wiring resistance and the resistance of the stator winding.

The objects of the present invention are achieved also by providing another embodiment of the variable-speed driving apparatus for an AC motor, which embodiment modifies the first embodiment by incorporating a regulator which in turn consists of differentiators for differentiating phase current values detected by the current detector.

Another preferred embodiment of the present invention is constructed by further providing the first embodiment of the variable-speed driving apparatus with another regulator which consists of differentiators for differentiating detected phase current values.

The objects of the present invention are achieved also by providing yet another embodiment of the variablespeed driving apparatus for an AC motor, which embodiment incorporates a means for generating a reference primary angular frequency value and reference biaxial voltage values of the AC motor defined in reference to a rotating orthogonal coordinate system, a power converter supplying the motor with AC voltage of variable amplitude and variable frequency based on the reference biaxial voltage values, a plurality of current detectors electrically coupled to output side of the power converter, two vector transformers, a regulator consisting of two amplifiers having as their input signals a set of output signals from a first vector transformer derived from the set of output signals generated by the current detectors, and a means for subtracting output signals of the regulator from the reference biaxial voltage values and outputting a set of results of the subtraction. A second vector transformer transforms output signals of the subtracting means to initial reference phase voltage values and transmits the initial reference phase voltage values to the power converter. The power converter generates primary phase voltage values based on the initial reference primary voltage values and drives the AC motor.

The objects of the present invention are achieved also by providing yet two further embodiments of the variable-speed driving apparatus for an AC motor, first of which two embodiments modifies the immediately preceding embodiment by replacing the regulator in the preceding embodiment with a regulator which consists of: differentiators and amplifiers to which the orthogonal biaxial current components are inputted from the first vector transformer; multipliers for multiplying output signals from the amplifiers with the reference primary angular frequency value, and a means for adding and subtracting output signals of the multipliers to and from output signals of the differentiators, output of the adding-and-subtracting means being the output of the first regulator. The second modification of the embodiment described in the above paragraph simply adds, in parallel to the first regulator, another regulator which consists of: differentiators and amplifiers to which the orthogonal biaxial current components are inputted from the first vector transformer; multipliers for multiplying output signals from the amplifiers with the reference primary angular frequency value, and a means for adding and subtracting output signals

DETAILED DESCRIPTION OF THE INVENTION

First Embodiment

Figure 1A:
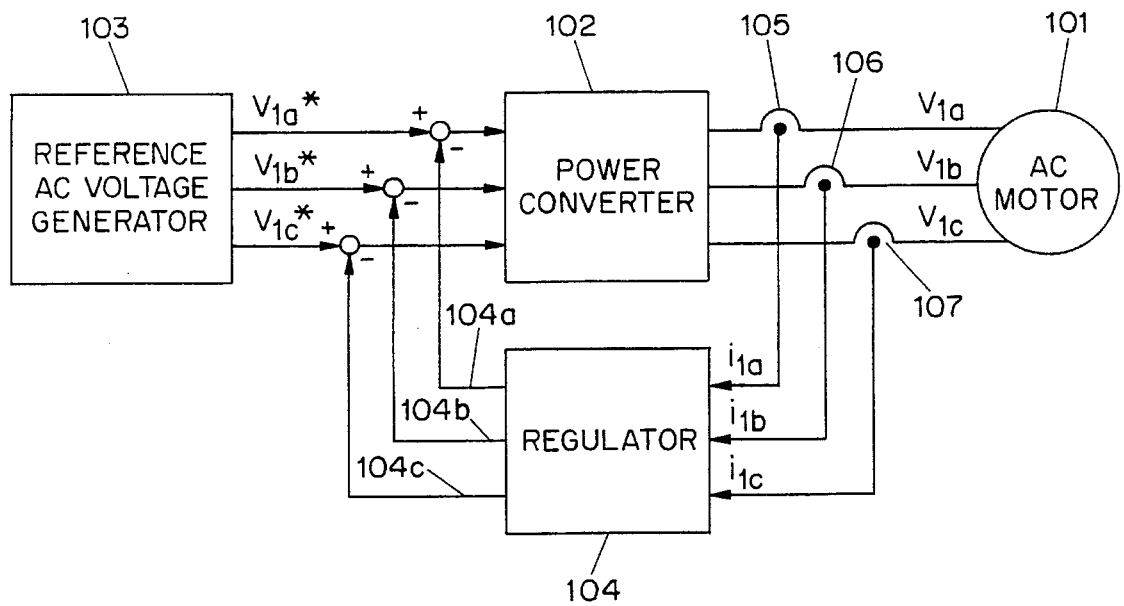
FIG. 1(a) is a block diagram of an apparatus for driving an AC motor according to the first embodiment of the present invention.
Figure 13:
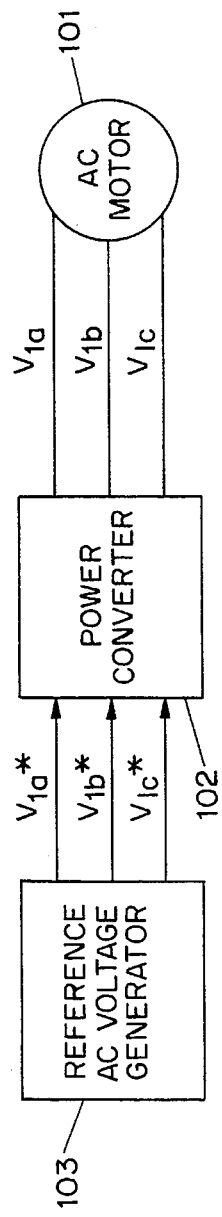
FIG. 13 is a block diagram of a prior art apparatus for driving an AC motor at variable speeds.

As seen in FIG. 1(a), which block diagram of a first embodiment of the present invention utilizes the same reference numerals for components previously identified in connection with the prior art apparatus shown in FIG. 13, current detectors 105, 106 and 107 are disposed between the power converter 102 and the three-phase AC motor 101. Phase current values $i_{1a}$, $i_{1b}$, and $i_{1c}$ detected by the current detectors 105, 106 and 107, respectively, are inputted to a regulator 104. Output signals $104_a$, $104_b$ and $104_c$ of the regulator 104 are subtracted from initial reference primary voltage values $V_{1a}^*$, $V_{1b}^*$, and $V_{1c}^*$, respectively, which voltage values correspond to the three phase of the AC motor and are fed from the reference AC voltage generator 103. Results of the subtraction are inputted to the power converter 102 as new, or final, reference primary voltage values.

Figure 1B:
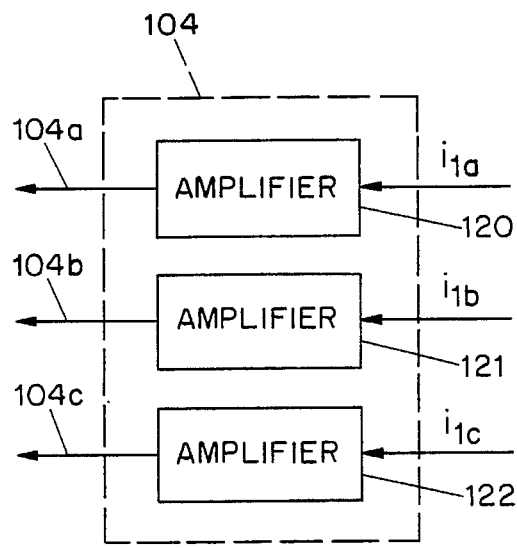
FIG. 1(b) is a detailed block diagram of the regulator incorporated in the embodiment shown in FIG. 1(a)

As seen in FIG. 1(b), the regulator 104 consists of amplifiers 120, 121 and 122 corresponding to each phase of the AC motor. The amplifiers 120, 121 and 122 generate their output signals $104_a$, $104_b$ and $104_c$, respectively, by multiplying the detected phase current values $i_{1a}$, $i_{1b}$, and $i_{1c}$ with a predetermined gain $K_R$. The resistance component is set through the gain $K_R$ of the amplifiers 120, 121 and 122.

The apparatus according to the first embodiment of the present invention varies the equivalent primary resistance of the AC motor 101 by amplifying in the regulator 104 the detected phase currents $i_{1a}$, $i_{1b}$ and $i_{1c}$ of the AC motor 101 by the gain $K_R$ of the amplifiers 120, 121 and 122, respectively, and by feeding to the power converter the final reference voltage values obtained by subtracting the amplified phase currents from the initial reference phase voltage values $V_{1a}^*$, $V_{1b}^*$, and $V_{1c}^*$. Feeding the final, or adjusted, reference primary phase voltage values, expressed by equation set 1 below, to the power converter 102 is equivalent to feeding the initial reference primary phase voltage values through a path having the resistance $K_R$ connected in series with the impedance of the AC motor 101. Therefore, an arbitrary primary resistance value can be realized by setting an appropriate gain $K_R$.

For the first embodiment of the present invention driving a three-phase AC motor 101, the primary phase voltage values $V_1$s ($V_{1a}$, $V_{1b}$, and $V_{1c}$) are given by equation set 1 which takes into consideration the initial reference phase voltage values ($V_{1a}^*$, $V_{1b}^*$ and $V_{1c}^*$) and the actual primary current values $i_1$s ($i_{1a}$, $i_{1b}$ and $i_{1c}$).

$$\left. \begin{array}{l} V_{1a} = V_{1a}^* - K_R i_{1a} \\ V_{1b} = V_{1b}^* - K_R i_{1b} \\ V_{1c} = V_{1c}^* - K_R i_{1c} \end{array} \right\} \quad (1)$$

Equivalent impedance value defined in terms of the initial reference phase voltage value is given by equation set 2 below, which is obtained by dividing each of the equations in equation set 1 by each of the corresponding actual phase current values.

$$\left. \begin{array}{l} V_{1a}^*/i_{1a} = K_R + V_{1a}/i_{1a} = K_R + R_1 + pL\sigma + e_a/i_{1a} \\ V_{1b}^*/i_{1b} = K_R + V_{1b}/i_{1b} = K_R + R_1 + pL\sigma + e_b/i_{1b} \\ V_{1c}^*/i_{1c} = K_R + V_{1c}/i_{1c} = K_R + R_1 + pL\sigma + e_c/i_{1c} \end{array} \right\} \quad (2)$$

By rearranging equations of the equation set 2, one obtains the following equation set 3.

$$V_{1a} = R_1 i_{1a} + pL\sigma i_{1a} + e_a \\ V_{1b} = R_1 i_{1b} + pL\sigma i_{1b} + e_b \\ V_{1c} = R_1 i_{1c} + pL\sigma i_{1c} + e_c \quad (3)$$

In the equation sets 2 and 3, as well in equations appearing below, $R_1$ represents a sum of the primary resistance value, the wiring resistance value and the resistance value of the stator winding of the AC motor; $L\sigma$ represents the leakage inductance; e represents the counterelectromotive force; and p represents the differentiating operator. As previously mentioned, the final reference phase voltage values fed to the AC motor may be seen as resulting from the initial reference phase voltage values fed through a path in which the resistance $K_R$ is inserted in series with the impedance of the AC motor.

By setting $K_R \gg R_1$, $(K_R+R_1)$ in the equation set 2 can be replaced with $K_R$, and the following equation set 4 is obtained.

$$V_{1a}*/i_{1a} = K_R + pL\sigma + e_a/i_{1a} \\ V_{1b}*/i_{1b} = K_R + pL\sigma + e_b/i_{1b} \\ V_{1c}*/i_{1c} = K_R + pL\sigma + e_c/i_{1c} \quad (4)$$

As the first term of the right hand side of equations in the equation set 4 clearly indicates, given the initial reference phase voltage values, arbitrary primary resistance value $K_R$ can be realized as the equivalent impedance of the AC motor. Moreover, stable operation performance is obtained by setting $K_R \gg R_1$ because the effects of temperature variation of $R_1$ and difference between intended and actual values of $R_1$ resulting from setting error are suppressed.

Second Embodiment

Figure 2A:
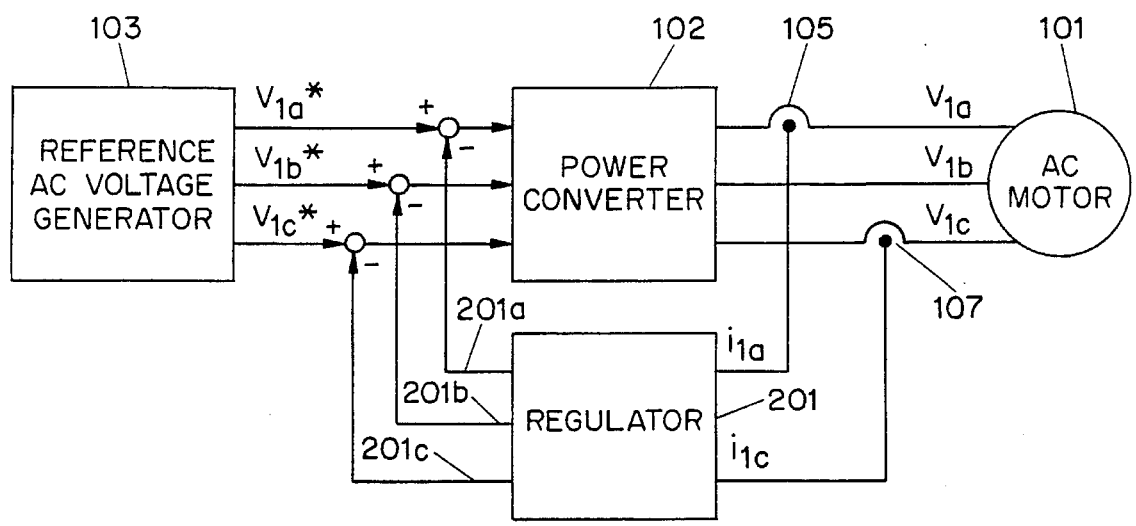
FIG. 2(a) is a block diagram of an apparatus for driving an AC motor according to the second embodiment of the present invention.

As seen in FIG. 2(a), a second embodiment of the present invention detects currents of two phases of the AC motor 101, $i_{1a}$ and $i_{1c}$, by two current detectors 105 and 107, respectively. Output signals for each phase $201_a$, $201_b$, and $201_c$ are generated by a regulator 201.

Figure 2B:
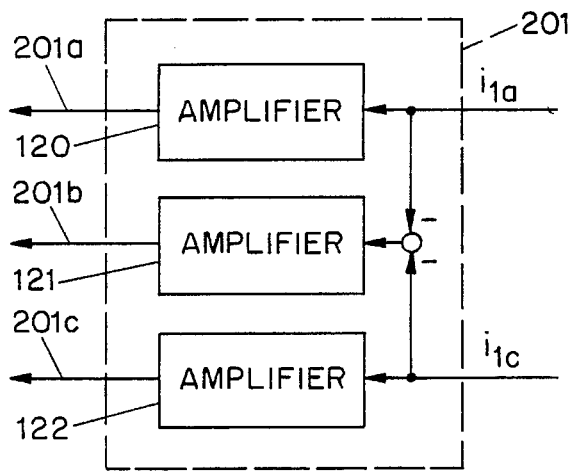
FIG. 2(b) is a detailed block diagram of one embodiment of the regulator incorporated in the embodiment shown in FIG. 2(a)
Figure 2C:
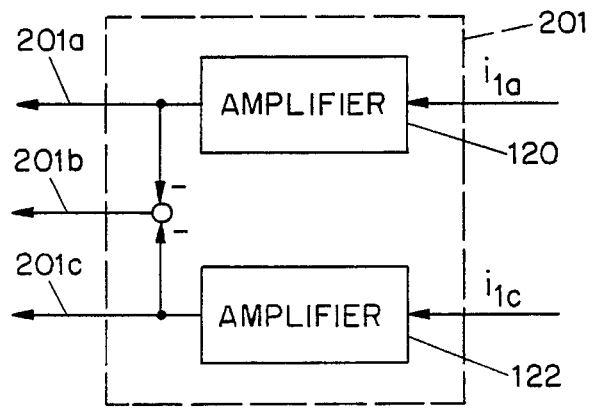
FIG. 2(c) is a detailed block diagram of another embodiment of the regulator incorporated in the embodiment shown in FIG. 2(a)

As seen in FIGS. 2(b) and 2(c), two different internal configurations of the regulator 201 are utilized for the second embodiment. The internal configuration of the regulator 201 shown in FIG. 2(b) consists of three amplifiers 120, 121 and 122, in which regulator the input signal to the amplifier 121 is synthesized on the input side of the regulator. The internal configuration of the regulator 201 shown in FIG. 2(c) consists of two amplifiers 120 and 122, in which regulator the output signals for the three phases are synthesized on the output side of the regulator from the output signals of the two amplifiers 120 and 122.

Third & Fourth Embodiments

The results achieved by the first and second embodiments of the present inventions are also achieved by third and fourth embodiments of the present invention in which orthogonal biaxial current components derived from the actual phase currents are multiplied by a predetermined gain $K_R$ and subtracted from biaxial reference voltage values. Both the orthogonal biaxial current components and the biaxial reference voltage values are defined in reference to a rotating orthogonal coordinate system.

The relationship between the voltage and the current of the AC motor in the rotating orthogonal coordinate system is expressed by equation 5.

$$\begin{pmatrix} V_{1d} \\ V_{1q} \end{pmatrix} = \begin{pmatrix} R_1 + pL\sigma & -\omega_1 L\sigma \\ \omega_1 L\sigma & R_1 + pL\sigma \end{pmatrix} \begin{pmatrix} i_{1d} \\ i_{1q} \end{pmatrix} + \begin{pmatrix} e_d \\ e_q \end{pmatrix} \quad (5)$$

In equation 5, $V_{1d}$ and $V_{1q}$ represent d- and q-axis components of the primary voltage, respectively, $i_{1d}$ and $i_{1q}$ represent d- and q-axis components of the primary current, respectively, $e_d$ and $e_q$ represent d- and q-axis components of the counterelectromotive force, respectively, and $\omega_1$ represents primary angular frequency.

In the third and fourth embodiments of the present invention, the biaxial current components, defined by equation set 6 below, are fed through a regulator consisting of amplifiers having a gain $K_R$. In the equation set 6, $V_{1d}*$ and $V_{1q}*$ represent d- and q-axis reference voltage values.

$$\begin{pmatrix} V_{1d} \\ V_{1q} \end{pmatrix} = \begin{pmatrix} V_{1d}* \\ V_{1q}* \end{pmatrix} - \begin{pmatrix} K_R & 0 \\ 0 & K_R \end{pmatrix} \begin{pmatrix} i_{1d} \\ i_{1q} \end{pmatrix} \quad (6)$$

By equating the right hand side of the equation set 5 with the right hand side of the equation set 6 and rearranging the resulting equation set, one obtains equation set 7 in which the series resistance on the primary side of the AC motor is expressed by $(K_R+R_1)$.

$$\begin{pmatrix} V_{1d}* \\ V_{1q}* \end{pmatrix} = \quad (7)$$

$$\begin{pmatrix} K_R + R_1 + pL\sigma & -\omega_1 L\sigma \\ \omega_1 L\sigma & K_R + R_1 + pL\sigma \end{pmatrix} \begin{pmatrix} i_{1d} \\ i_{1q} \end{pmatrix} + \begin{pmatrix} e_d \\ e_q \end{pmatrix}$$

Stable operation performance is obtained by setting $K_R \gg R_1$ because the effect of an error in setting $R_1$ is substantially eliminated. By substituting $K_R$ for $(K_R+R_1)$, i.e., substituting $(K_R-R_1)$ for $K_R$, one obtains equation set 8, and arbitrary primary resistance value $K_R$ is obtained as in the first two embodiments of the present invention.

$$\begin{pmatrix} V_{1d}* \\ V_{1q}* \end{pmatrix} = \begin{pmatrix} K_R + pL\sigma & -\omega_1 L\sigma \\ \omega_1 L\sigma & K_R + pL\sigma \end{pmatrix} \begin{pmatrix} i_{1d} \\ i_{1q} \end{pmatrix} + \begin{pmatrix} e_d \\ e_q \end{pmatrix} \quad (8)$$

Figure 3:
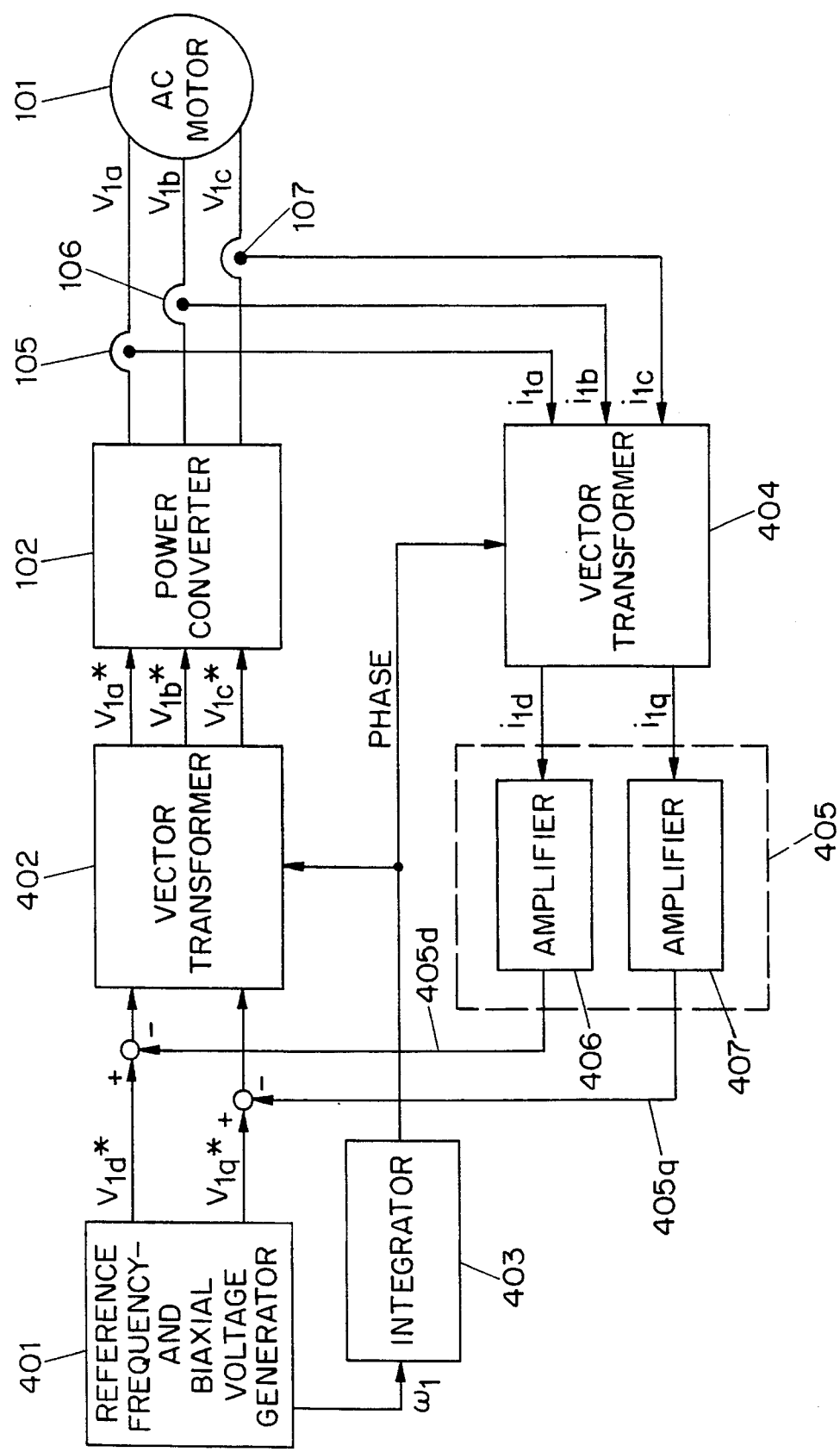
FIG. 3 is a block diagram of an apparatus for driving an AC motor according to the third embodiment of the present invention.

As seen in FIG. 3, a block diagram of the third embodiment of the present invention, an angular-frequency/biaxial-reference-voltage generator 401 generates a reference primary angular frequency $\omega_1$ and biaxial reference voltage values $V_{1d}*$ and $V_{1q}*$ in a rotating orthogonal coordinate system. A vector transformer 404 transforms phase current values $i_{1a}$, $i_{1b}$ and $i_{1c}$ detected by the current detectors 105, 106 and 107, respectively, to biaxial current components $i_{1d}$ and $i_{1q}$ in a rotating orthogonal coordinate system. Further, a phase value obtained by integrating the reference primary angular frequency $\omega_1$ in an integrator 403 is inputted to the vector transformer 404.

The biaxial current components $i_{1d}$ and $i_{1q}$ generated by the vector transformer 404 is inputted to a regulator 405 which consists of amplifiers 406 and 407. In the regulator 405, the biaxial current components $i_{1d}$ and $i_{1q}$ are multiplied by the gain $K_R$ and converted to signals $405_d$ and $405_q$, respectively. The signals $405_d$ and $405_q$ are subtracted from the biaxial reference voltage values $V_{1d}*$ and $V_{1q}*$, respectively, outputted from the angular-frequency/biaxial-reference-voltage generator 401, and results of the subtraction are inputted to a vector transformer 402.

The vector transformer 402 transforms the biaxial reference voltage values $V_{1d}*$ and $V_{1q}*$ to the initial reference primary voltage values $V_{1a}^*$, $V_{1b}^*$ and $V_{1c}^*$ for each phase and outputs the initial reference primary voltage values to the power converter 102. The power converter 102 generates the primary phase voltage values $V_{1a}$, $V_{1b}$ and $V_{1c}$ based on the initial reference primary voltage values $V_{1a}^*$, $V_{1b}^*$ and $V_{1c}^*$, respectively, and feeds the primary phase voltage values $V_{1a}$, $V_{1b}$ and $V_{1c}$ to the AC motor 101.

An arbitrary, equivalent primary resistance of the AC motor is achieved with the third embodiment by subtracting the signals derived from the biaxial current components $i_{1d}$ and $i_{1q}$, which are defined in the rotating orthogonal coordinate system, from the biaxial reference voltage values $V_{1d}^*$ and $V_{1q}^*$, and by obtaining the final reference phase voltage values $V_{1a}^*$, $V_{1b}^*$ and $V_{1c}^*$ by coordinate transformation of the results of the above-mentioned subtraction. Further, by setting $K_R \gg R_1$, where $R_1$ represents the sum of the primary resistance of the AC motor, the wiring resistance and the stator winding resistance, effects of an error in setting $R_1$ are substantially eliminated and a stable drive performance is obtained.

Figure 4:
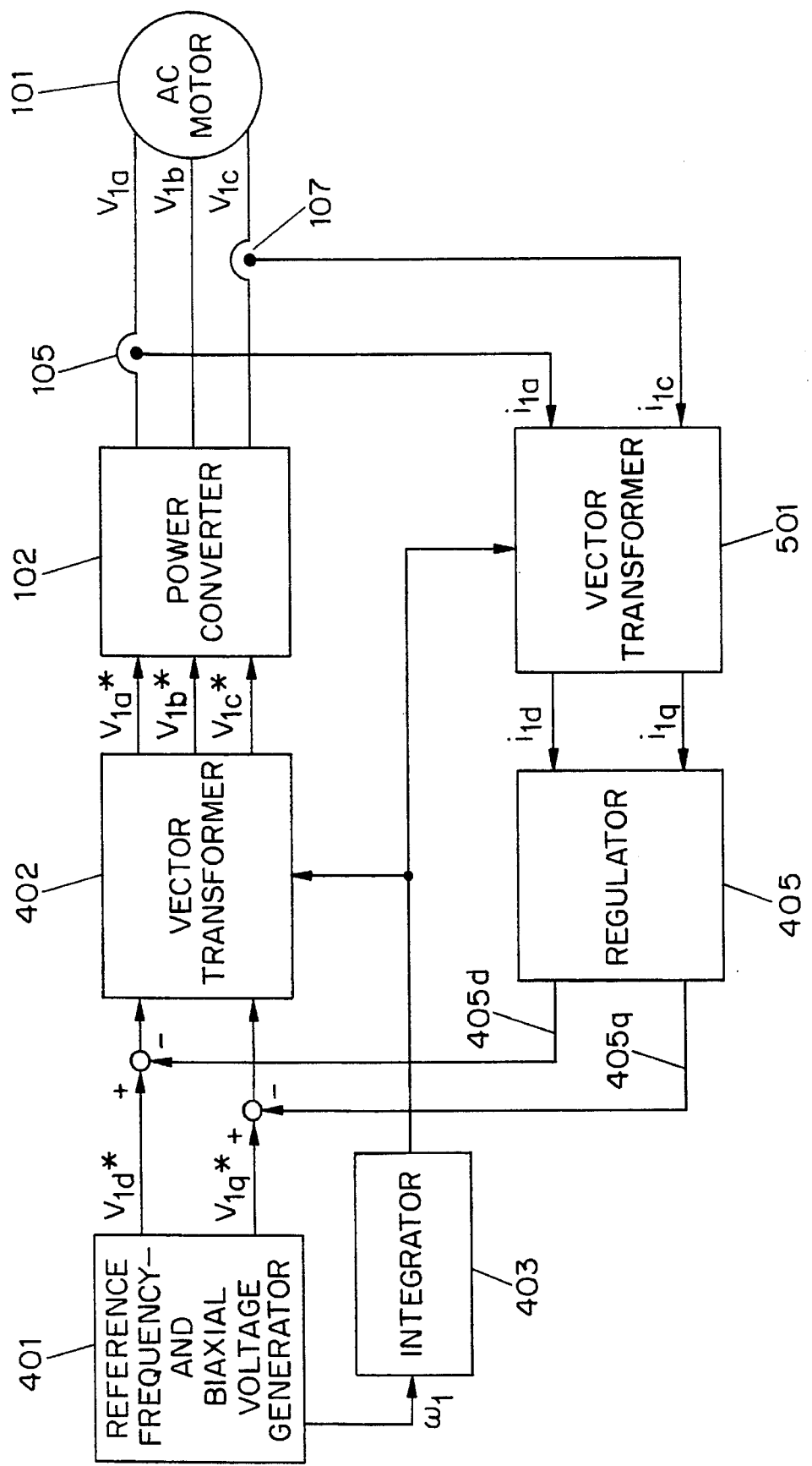
FIG. 4 is a block diagram of an apparatus for driving an AC motor according to the fourth embodiment of the present invention.

As seen in FIG. 4, the fourth embodiment of the present invention is substantially similar to the third embodiment. The fourth embodiment differs from the third embodiment in that the fourth embodiment consists of two current detectors 105 and 107 which feed phase currents to a vector transformer 501. The overall operation of the third and fourth embodiments shown in FIGS. 3 and 4, respectively, are substantially the same.

In addition to the advantages of the first and second embodiment, the third and fourth embodiments of the present invention facilitate, with minimum number of components, variable-speed driving of an AC motor irrespective of number of phases of the power converter or the AC motor.

Fifth & Sixth Embodiments

Figure 5A:
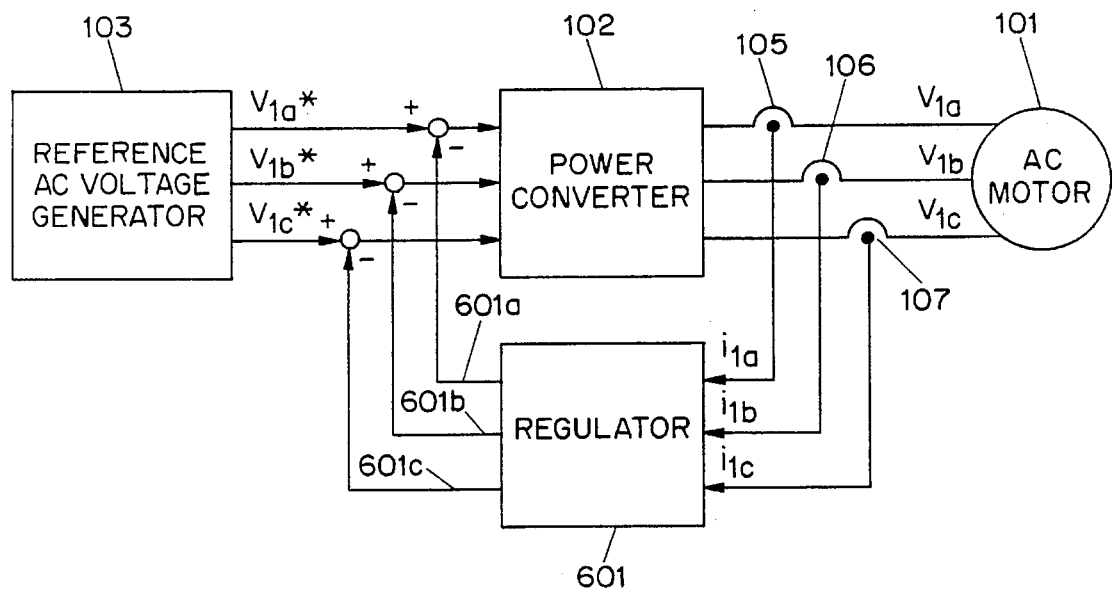
FIG. 5(a) is a block diagram of an apparatus for driving an AC motor according to the fifth embodiment of the present invention.
Figure 5B:
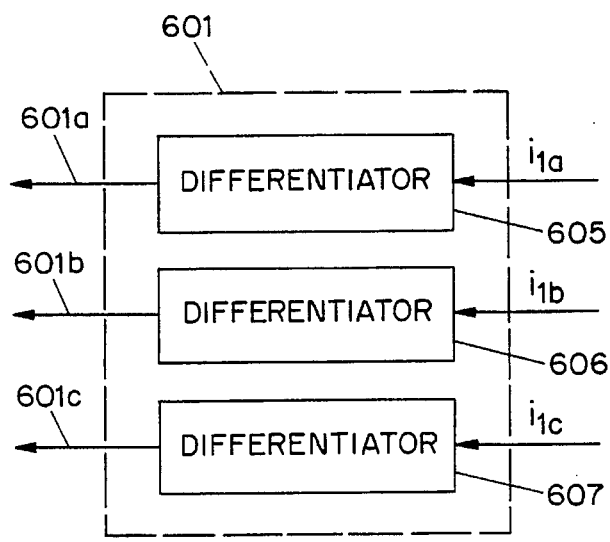
FIG. 5(b) is a detailed block diagram of the regulator incorporated in the embodiment shown in FIG. 5(a)

Shown in FIG. 5(a) is a block diagram of a fifth embodiment of the present invention, which is substantially similar to the first embodiment shown in FIG. 1(a) except a different regulator 601 incorporated in the fifth embodiment. As seen in FIG. 5(b), the regulator 601 consists of differentiators 605, 606 and 607 which generate signals $601_a$, $601_b$ and $601_c$, respectively. The signals $601_a$, $601_b$ and $601_c$ are obtained by multiplying the detected phase current values $i_{1a}$, $i_{1b}$ and $i_{1c}$ by a gain $K_L$. The output signals $601_a$, $601_b$ and $601_c$ are subtracted from the initial reference primary voltage values $V_{1a}^*$, $V_{1b}^*$ and $V_{1c}^*$, respectively, and results of the subtraction, i.e., final reference primary voltage values, are inputted to the power converter 102. An inductance component is set by appropriate selection of the gain $K_L$ of the differentiators 605, 606 and 607.

For the fifth embodiment of the present invention, equation set 9 is obtained by setting $K_L$ as the gain of differentiators which constitute the regulator 601, and by subtracting signals, or values, derived from the detected primary current value of each phase from the initial reference primary voltage values.

$$\left. \begin{array}{l} V_{1a} = V_{1a}^* - pK_L i_{1a} \\ V_{1b} = V_{1b}^* - pK_L i_{1b} \\ V_{1c} = V_{1c}^* - pK_L i_{1c} \end{array} \right\} \quad (9)$$

The equivalent impedance defined in terms of the initial reference phase voltage values, as expressed by equation set 10, is obtained by dividing the three equations in the equation set 9 by the detected primary current values $i_{1a}$, $i_{1b}$ and $i_{1c}$, respectively.

$$\left. \begin{array}{l} V_{1a}^*/i_{1a} = pK_L + V_{1a}/i_{1a} = R_1 + pK_L + pL\sigma + e_a/i_{1a} \\ V_{1b}^*/i_{1b} = pK_L + V_{1b}/i_{1b} = R_1 + pK_L + pL\sigma + e_b/i_{1b} \\ V_{1c}^*/i_{1c} = pK_L + V_{1c}/i_{1c} = R_1 + pK_L + pL\sigma + e_c/i_{1c} \end{array} \right\} \quad (10)$$

When the equivalent impedance is expressed in terms of the initial reference phase voltage values, the leakage inductance portion of the equivalent impedance is expressed by $(K_L + L\sigma)$. By further substituting $(K_L - L\sigma)$ for $K_L$ in equation set 10, one obtains equation set 11 below. As can be seen from the equation set 11, the leakage inductance can be set arbitrarily. Further, if one assumes the gain to be $(-L\sigma)$, theoretical leakage inductance can be reduced to zero.

$$\left. \begin{array}{l} V_{1a}^*/i_{1a} = R_1 + pK_L + e_a/i_{1a} \\ V_{1b}^*/i_{1b} = R_1 + pK_L + e_b/i_{1b} \\ V_{1c}^*/i_{1c} = R_1 + pK_L + e_c/i_{1c} \end{array} \right\} \quad (11)$$

A sixth embodiment of the present invention, shown in FIG. 6(a), detects currents of two phases of the threephase AC motor 101, $i_{1a}$ and $i_{1c}$, by two current detectors 105 and 107, respectively. Output signals $701_a$, $701_b$ and $701_c$ for each of the three phases are generated by a regulator 701.

FIGS. 6(b) and 6(c) show two different internal configurations of the regulator 701 shown in FIG. 6(a). Internal configuration of the regulator 701 of FIG. 6(b) consists of three differentiators 605, 606 and 607, in which regulator the input signal to the differentiator 606 is synthesized on the input side of the regulator. Internal configuration of the regulator 701 of FIG. 6(c) consists of two differentiators 605 and 607, in which regulator the output signal $701_b$ is derived from the signals $701_a$ and $701_c$ generated from the differentiators 605 and 607, respectively.

As equation sets 10 and 11 express, the fifth and sixth embodiments facilitate setting an arbitrary equivalent leakage inductance of the AC motor by adjusting the gain $K_L$ of the differentiators 605, 606 and 607. By setting the equivalent leakage inductance for a given AC motor at an optimum value through the adjustment of the gain $K_L$, manual adjustment of the reference AC voltage values, i.e., the initial reference phase voltage values, is obviated.

According to the fifth and sixth embodiments, not only can the equivalent leakage inductance be set and altered arbitrarily by appropriately setting the gain of the differentiators, but this arrangement also avoids creation of reactive power usually associated with incorporating inductance elements in a device. Further, stability of variable-speed operation is improved by reducing the time constant attributable to the leakage inductance and $R_1$.

Seventh & Eighth Embodiments

Figure 7A:
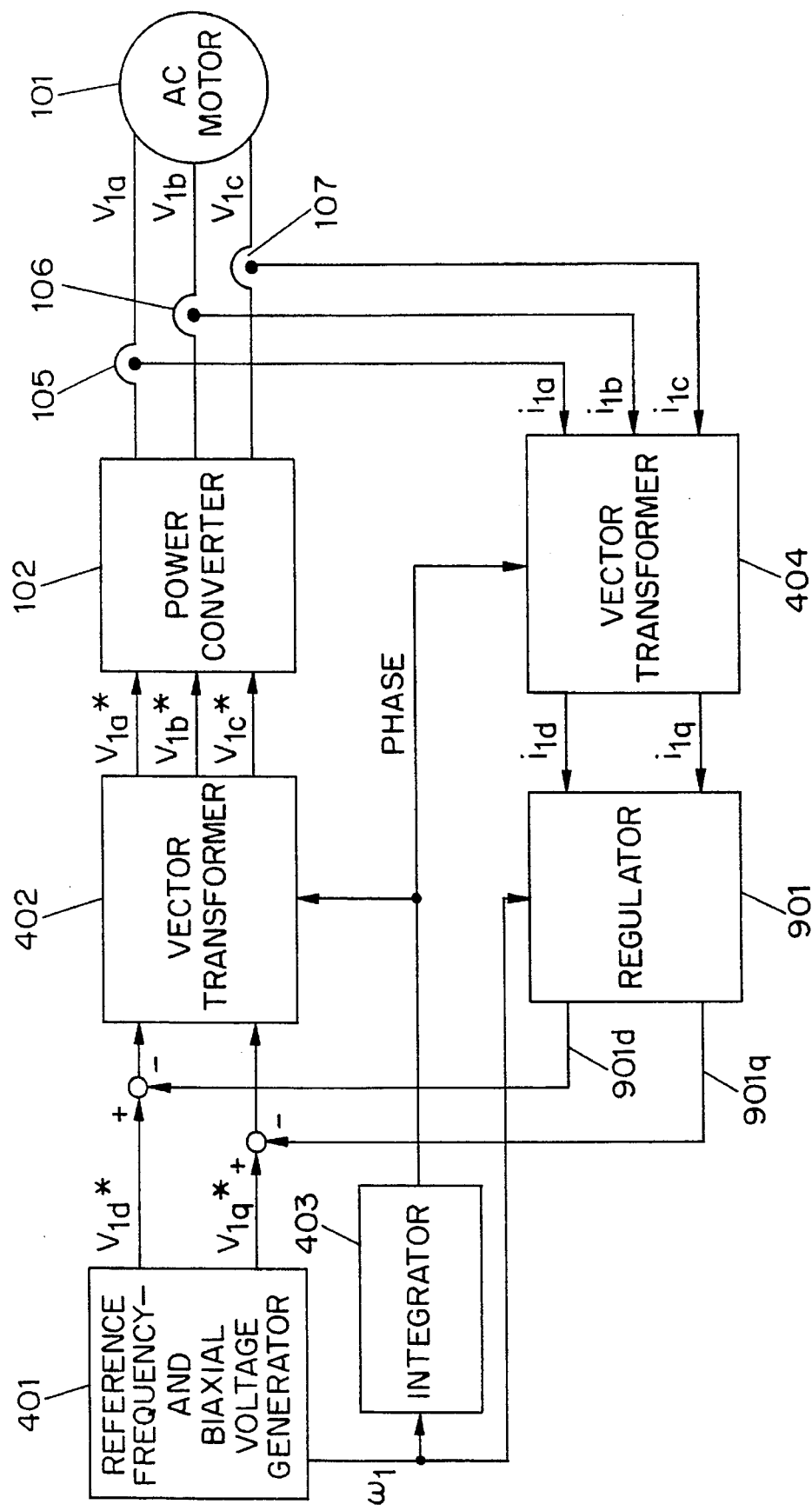
FIG. 7(a) is a block diagram of an apparatus for driving an AC motor according to the seventh embodiment of the present invention.

Shown in FIG. 7(a) is a seventh embodiment of the present invention, which differs from the third embodiment of FIG. 3 in two respects. The seventh embodiment has a different regulator 901, and the reference primary angular frequency value $\omega_1$ is inputted to the regulator 901 as well as to the two vector transformers 402 and 404.

Figure 7B:
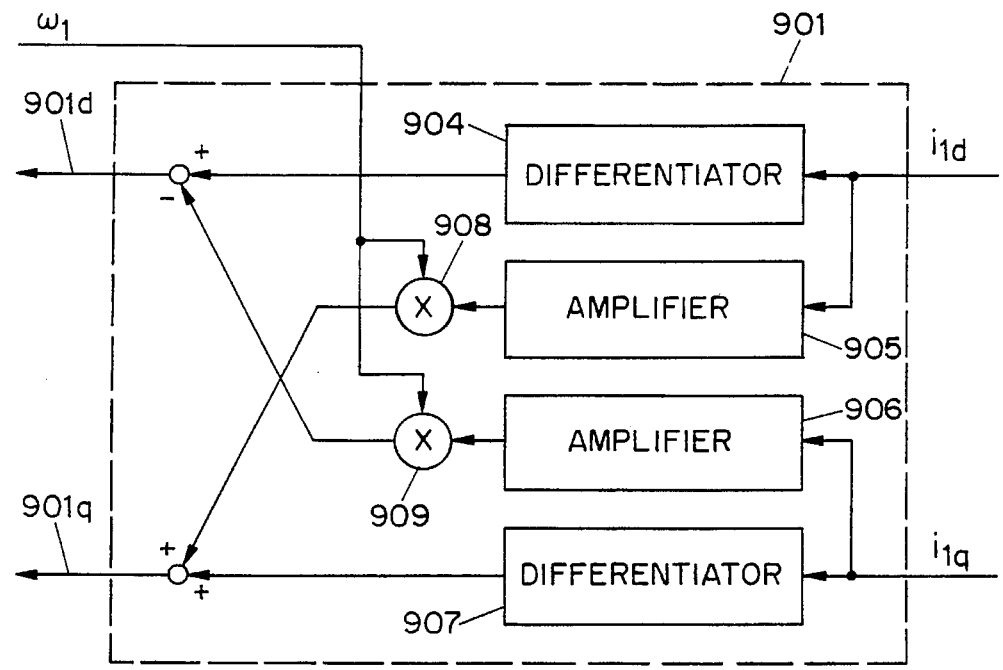
FIG. 7(b) is a detailed block diagram of the regulator incorporated in the embodiment shown in FIG. 7(a)

As seen in FIG. 7(b), the regulator 901 consists of differentiators 904 and 907, and amplifiers 905 and 906. Biaxial current components $i_{1d}$ and $i_{1q}$, which are calculated in the vector transformer 404, are inputted to the differentiators and the amplifiers, as shown in FIG. 7(b). Multipliers 908 and 909 multiply output signals of the amplifiers 905 and 906 with the reference primary angular frequency value $\omega_1$, respectively. An adding-and-subtracting means adds an output signal of the multipliers 908 to the output signals of differentiators 907, and subtracts an output signal of the multiplier 909 from the output signal of the differentiator 904.

In the seventh embodiment, the output signals $901_d$ and $901_q$ of the regulator 901 are calculated from the biaxial current components $i_{1d}$ and $i_{1q}$ and the reference primary angular frequency value $\omega_1$. Equivalent leakage reactance of the AC motor is set by means of a gain $K_{L2}$ of the amplifiers 905 and 906, and equivalent transient leakage inductance is set by means of a gain $K_{L1}$ of the differentiators 904 and 907. Accordingly, as equation sets 13 and 14 below express, the seventh embodiment facilitates arbitrary, independent setting of transient impedance and reactance of the AC motor by adjusting the gain $K_{L1}$ of the differentiators 904 and 907, and by adjusting the gain $K_{L2}$ Of the amplifiers 905 and 906, respectively.

Figure 8:
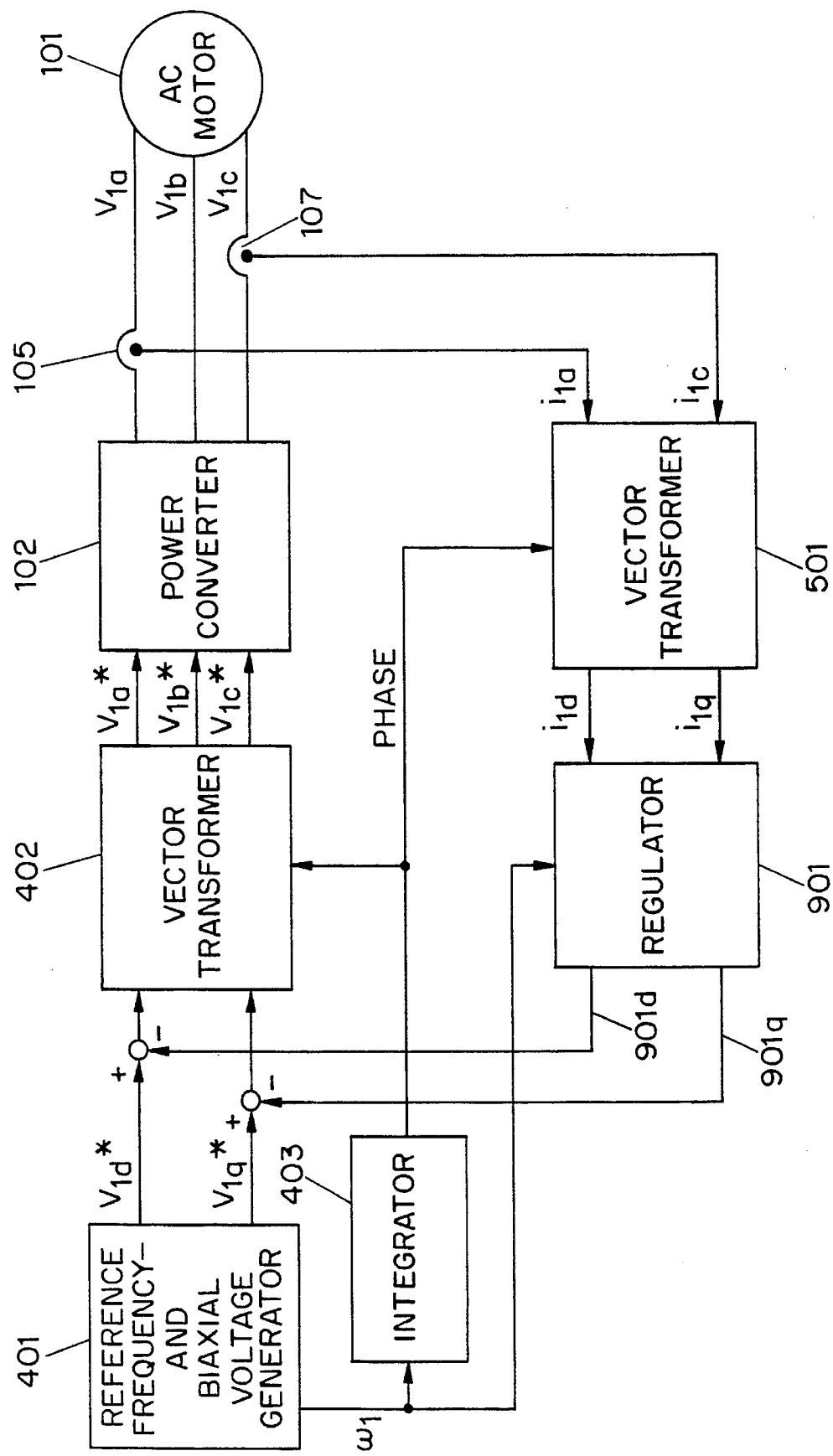
FIG. 8 is a block diagram of an apparatus for driving an AC motor according to the eighth embodiment of the present invention.

Shown in FIG. 8 is an eighth embodiment of the present invention, which modifies, and differs from, the seventh embodiment of the present invention shown in FIG. 7 in that the eighth embodiment incorporates two current detectors 105 and 107 for feeding detected phase current values to the vector transformer 501.

The seventh and eighth embodiments achieve feedback of the leakage inductance term shown in equation set 5 by means of the regulator. This effect is realized by amplifying and differentiating in the regulator the orthogonal biaxial current components, and by feeding back the amplified or differentiated values to the biaxial reference voltage values in a rotating orthogonal coordinate system. Equation set 12 shown below expresses the feedback effect.

$$\begin{pmatrix} V_{1d} \\ V_{1q} \end{pmatrix} = \begin{pmatrix} V_{1d}^* \\ V_{1q}^* \end{pmatrix} - \begin{pmatrix} pK_{L1} & -\omega_1 K_{L2} \\ \omega_1 K_{L2} & pK_{L1} \end{pmatrix} \begin{pmatrix} i_{1d} \\ i_{1q} \end{pmatrix} \quad (12)$$

In equation set 12, $K_{L1}$ represents the gain of the differentiators, and $K_{L2}$ represents the gain of the amplifiers. Equation set 13 is obtained by equating the right side of the equation set 5 with the right side of the equation set 12 and rearranging the resulting equation.

$$\begin{pmatrix} V_{1d}^* \\ V_{1q}^* \end{pmatrix} = \begin{pmatrix} R_1 + pL\sigma + pK_{L1} & -\omega_1 L\sigma - \omega_1 K_{L2} \\ \omega_1 L\sigma + \omega_1 K_{L2} & R_1 + pL\sigma + pK_{L1} \end{pmatrix} \begin{pmatrix} i_{1d} \\ i_{1q} \end{pmatrix} + \begin{pmatrix} e_d \\ e_q \end{pmatrix} \quad (13)$$

As can be seen from the equation set 13, the leakage inductance includes a transient impedance component $p(L\sigma+K_{L1})$ and reactance component $\omega_1$ $(L\sigma+K_{L2})$. The gains $K_{L1}$ and $K_{L2}$ can be set independently in the differentiators and the amplifiers. Further, equation set 14 is obtained from the equation set 13 by replacing $K_{L1}$ and $K_{L2}$ with $(K_1-L\sigma)$ and $(K_{L2}-L\sigma)$, respectively.

$$\begin{pmatrix} V_{1d}^* \\ V_{1q}^* \end{pmatrix} = \begin{pmatrix} R_1 + pK_{L1} & -\omega_1 K_{L2} \\ \omega_1 K_{L2} & R_1 + pK_{L1} \end{pmatrix} \begin{pmatrix} i_{1d} \\ i_{1q} \end{pmatrix} + \begin{pmatrix} e_d \\ e_q \end{pmatrix} \quad (14)$$

From the equation set 14, it is apparent that the leakage inductance can be set at, or changed to, an arbitrary value by adjusting $K_{L1}$ and $K_{L2}$ since the transient impedance and the reactance component are represented by $pK_{L1}$ and $\omega_1 K_{L2}$, respectively. Further, if one assumes ($-L\sigma$) to be the respective gain of the differentiators and the amplifiers, theoretical leakage inductance or leakage reactance can be substantially eliminated.

The seventh and eight embodiments can set the transient impedance component and the reactance component independently by means of adjusting the respective gains of the differentiators and the amplifiers. Further, since the leakage inductance and its reactance component may be reduced, stability of variable-speed operation is improved by reducing the time constant attributable to the leakage inductance and $R_1$.

Ninth Embodiment

Figure 6:
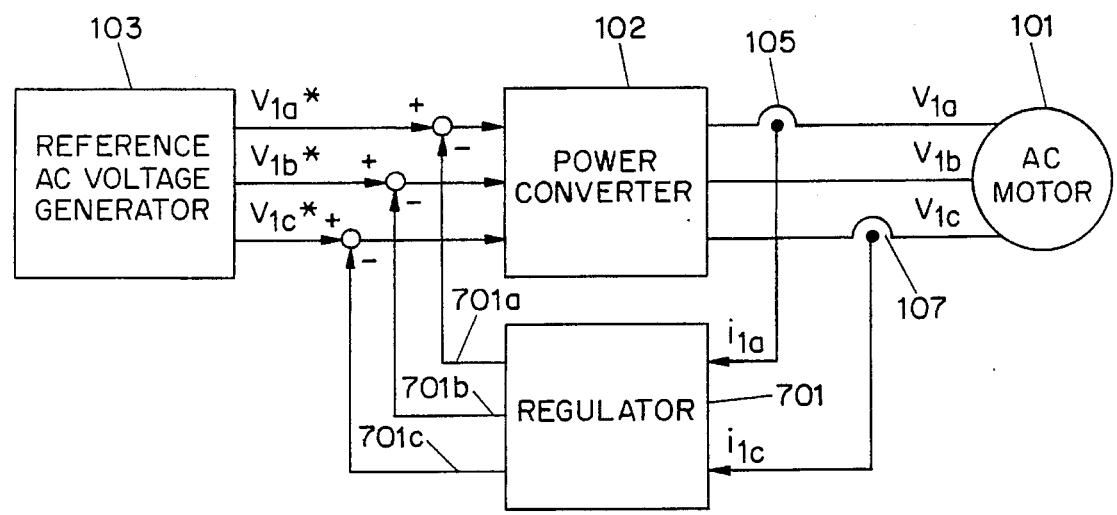
FIG. 6(a) is a block diagram of an apparatus for driving an AC motor according to the sixth embodiment of the present invention.
FIG. 6(b) is a detailed block diagram of one embodiment of the regulator incorporated in the embodiment shown in FIG. 6(a)
FIG. 6(c) is a detailed block diagram of another embodiment of the regulator incorporated in the embodiment shown in FIG. 6(a)
Figure 6:
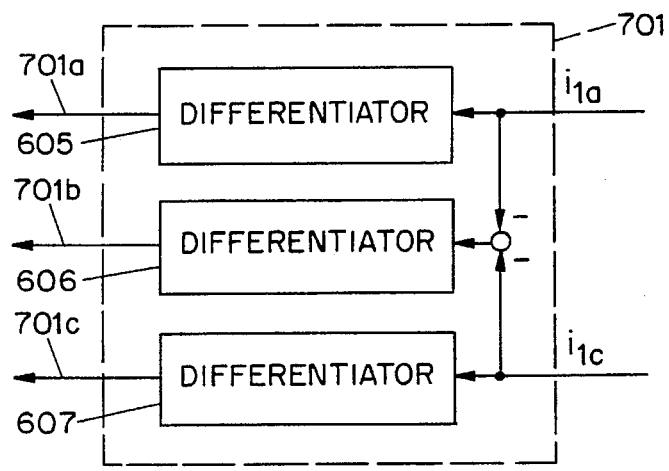
Figure 6:
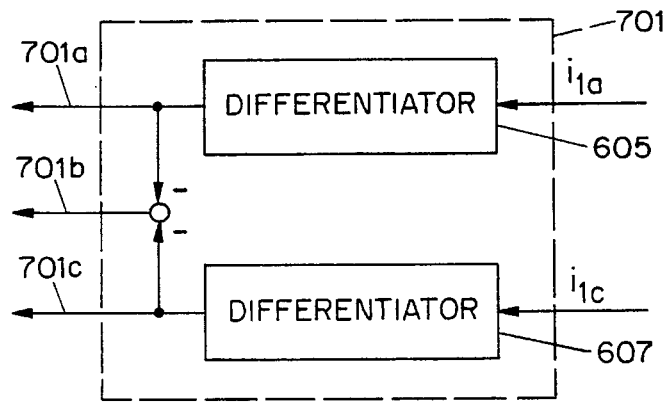
Figure 9:
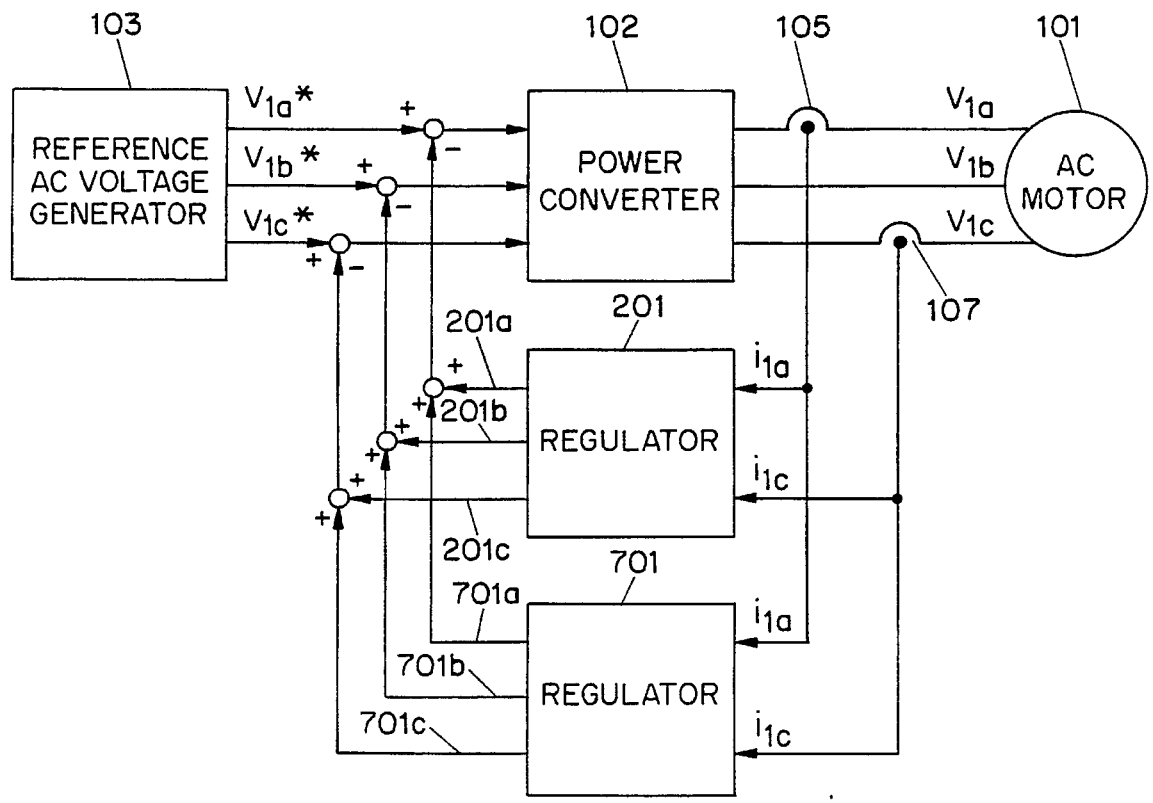
FIG. 9 is a block diagram of an apparatus for driving an AC motor according to the ninth embodiment of the present invention.

As seen in FIG. 9, a ninth embodiment of the present invention is configured by providing the second embodiment shown in FIGS. 2 with the regulator 701 of the sixth embodiment shown in FIGS. 6. The output signals $201_a$, $201_b$ and $201_c$ of the regulator 201 are added to the output signals $701_a$, $701_b$ and $701_c$ of the regulator 701. Results of the addition are subtracted from the initial reference phase voltage values $V_{1a}^*$, $V_{1b}^*$ and $V_{1c}^*$, respectively, and results of this subtraction are fed to the power converter 102.

The ninth embodiment adjusts equivalent primary resistance and equivalent leakage inductance of the AC motor by means of the regulators 201 and 701, respectively. The regulator 201 consists of amplifiers having the gain $K_R$, and the regulator 701 consists of differentiators having the gain $K_L$. Since the regulators 201 and 701 do not affect one another, the primary resistance and the leakage inductance can be controlled independently.

Since the ninth embodiment can simultaneously vary one or both of the equivalent primary resistance and the leakage inductance, this embodiment facilitates improved stability of variable-speed operation by reducing the time constant attributable to the equivalent primary resistance and the leakage inductance of the AC motor.

The effects achieved by the ninth embodiment may also be achieved by providing the first embodiment of FIG. 1 with the regulator 601 of the fifth embodiment shown in FIG. 5 or the regulator 701 of the sixth embodiment shown in FIG. 6.

Tenth Embodiment

Figure 10:
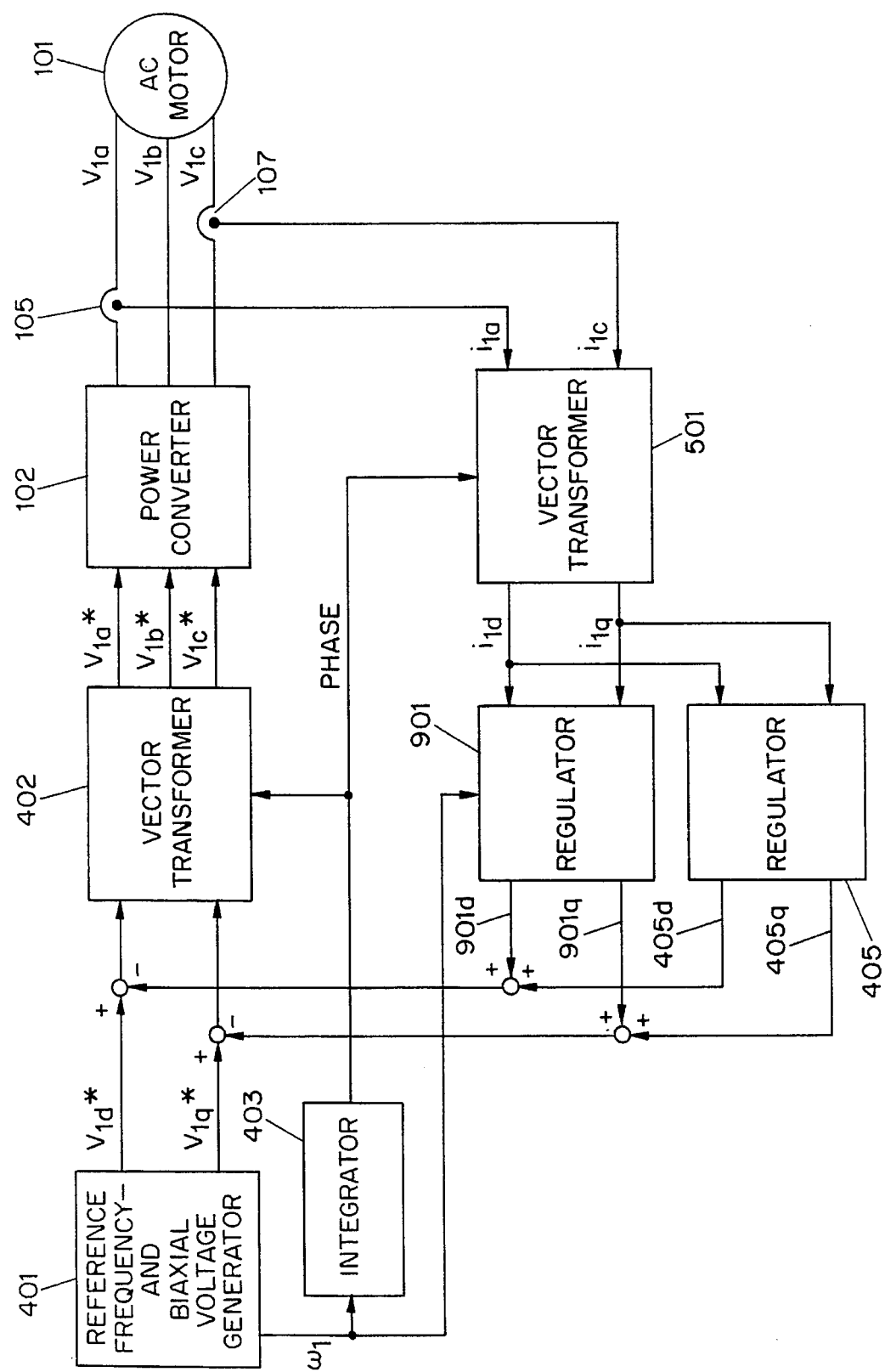
FIG. 10 is a block diagram of an apparatus for driving an AC motor according to the tenth embodiment of the present invention.

A tenth embodiment of the present invention, shown in FIG. 10, is obtained by providing the fourth embodiment shown in FIG. 4 with the regulator 901 of the eighth embodiment shown in FIG. 8. The tenth embodiment adjusts equivalent primary resistance and equivalent leakage inductance of the AC motor by means of the regulators 405 and 901, respectively. The regulator 405 consists of amplifiers having the gain $K_R$, and the regulator 901 consists of differentiators having the gain $K_{L1}$ and amplifiers having the gain $K_{L2}$. Since the regulators 405 and 901 do not interfere with the operation of one another, the primary resistance and the leakage inductance can be controlled independently.

Since the tenth embodiment can simultaneously vary one or both of the equivalent primary resistance and the leakage inductance, this embodiment facilitates improved stability of variable-speed operation by reducing the time constant attributable to the equivalent primary resistance and the leakage inductance of the AC motor.

The effects achieved by the tenth embodiment may also be achieved by providing the third embodiment shown in FIG. 3 with the regulator 901 incorporated in the seventh embodiment shown in FIG. 7.

Eleventh Embodiment

Figure 11:
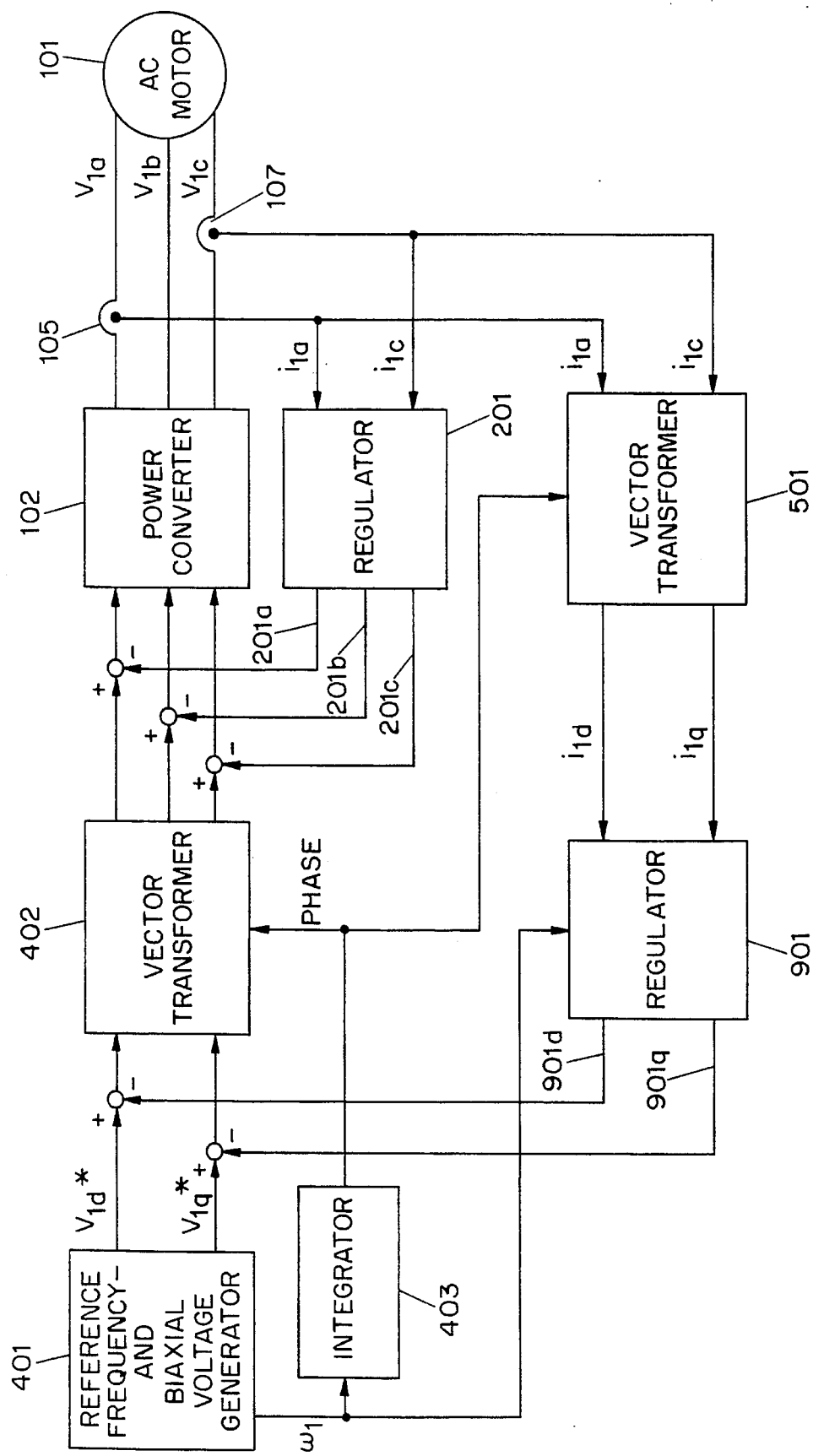
FIG. 11 is a block diagram of an apparatus for driving an AC motor according to the eleventh embodiment of the present invention.

An eleventh embodiment of the present invention, as seen in FIG. 11, is obtained by providing the eighth embodiment of the present invention with the regulator 201 incorporated in the second embodiment shown in FIG. 2. The eleventh embodiment adjusts equivalent primary resistance and equivalent leakage inductance of the AC motor by means of the regulators 201 and 901, respectively. The regulator 201 consists of amplifiers having the gain $K_R$, and the regulator 901 consists of differentiators having the gain $K_{L1}$ and amplifiers having the gain $K_{L2}$.

As previously mentioned, the apparatus shown in FIG. 8 can set an arbitrary equivalent leakage inductance. The equivalent primary resistance can also be set or changed arbitrarily by providing the apparatus of FIG. 8 with a feedback function provided by the regulator 201, which consists of amplifiers having the gain $K_R$ and feeds back the detected primary currents to the reference voltage values. Since the regulators 201 and 901 do not interfere with each other, the primary resistance and the leakage inductance can be controlled independently.

Since the eleventh embodiment can simultaneously vary one or both of the equivalent primary resistance and the leakage inductance, this embodiment facilitates improved stability of variable-speed operation by reducing the time constant attributable to the equivalent primary resistance and the leakage inductance of the AC motor.

The effects achieved by the eleventh embodiment may also be achieved by providing the seventh embodiment of FIG. 7 with the regulator 104 incorporated in the first embodiment shown in FIG. 1, or the regulator 201 incorporated in the second embodiment shown in FIG. 2.

Twelfth Embodiment

Figure 12:
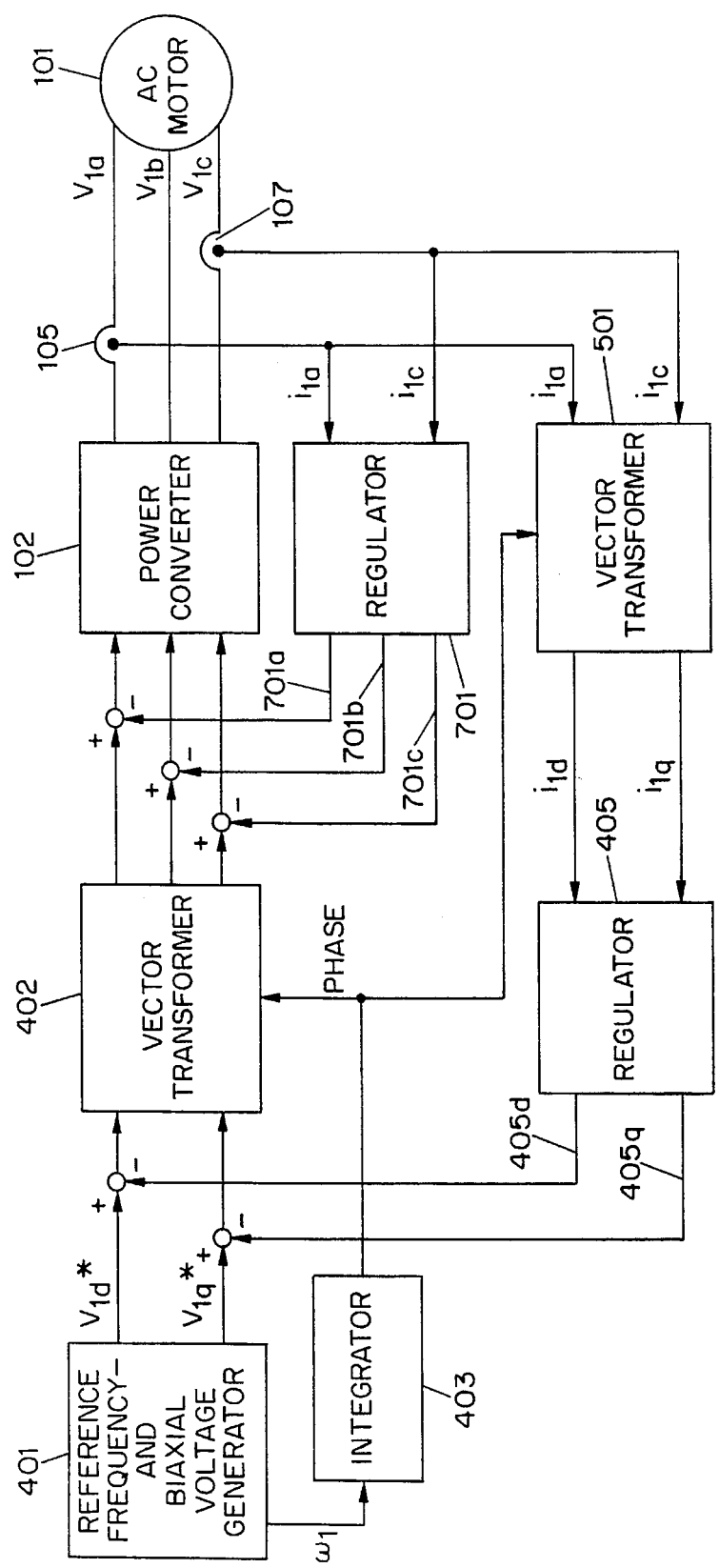
FIG. 12 is a block diagram of an apparatus for driving an AC motor according to the twelfth embodiment of the present invention.

A twelfth embodiment of the present invention, shown in FIG. 12, is obtained by providing the fourth embodiment shown in FIG. 4 with the regulator 701 of the sixth embodiment shown in FIGS. 6. The twelfth embodiment adjusts equivalent primary resistance and equivalent leakage inductance of the AC motor by means of the regulators 405 and 701, respectively. The regulator 405 consists of amplifiers having the gain $K_R$, and the regulator 701 consists of differentiators having the gain $K_L$.

As previously mentioned, the apparatus shown in FIG. 4 can arbitrarily vary equivalent primary resistance. By providing the apparatus shown in FIG. 4 with a feedback function provided by the regulator 701, which consists of differentiators having the gain $K_L$ and feeds back the differentiated primary currents to the reference voltage values, the equivalent leakage inductance can also be set arbitrarily. Since the regulators 405 and 701 do not interfere with one another, the primary resistance and the leakage inductance can be controlled independently.

Since the twelfth embodiment can simultaneously vary one or both of the equivalent primary resistance and the leakage inductance, this embodiment facilitates improved stability of variable-speed operation by reducing the time constant attributable to the equivalent primary resistance and the leakage inductance of the AC motor.

The effect achieved by the twelfth embodiment may also be achieved by providing the third embodiment of FIG. 3 with the regulator 601 incorporated in the fifth embodiment of FIG. 5, or the regulator 701 incorporated in the sixth embodiment shown in FIG. 6.

Although the present invention has been described in connection with the foregoing embodiments, these embodiments are merely illustrative and are not intended to be limiting. It should be readily apparent to those skilled in the art that other modifications are possible, and the present invention is intended to encompass these modifications. For example, although the embodiments have been described in connection with a three-phase AC motor, the present invention is also applicable to driving AC motors having different number of phases. In addition, the embodiments described above are also readily realized by a microprocessor executing a program.

I claim:

1. An apparatus for driving an AC motor having a primary resistance and a leakage inductance at variable speeds, which comprises:

means for generating reference voltage values having reference frequency and amplitude values;

a power converter electrically coupled to said AC motor for supplying AC voltage of variable amplitude and variable frequency based on said reference voltage values;

a plurality of current detectors electrically coupled to output side of said power converter for detecting at least two phase currents generated by said power converter, said current detector generating a set of output signals representing the detected phase current values;

a first regulator having as its input signals one of said set of output signals generated by said plurality of current detectors and having gain means for applying a selected gain value to inputs of said first regulator, said selected gain value being a function of at least one of said primary resistance and said leakage inductance of said AC motor; and a subtracting means having its input side electrically coupled to output side of said first regulator and output side of said reference-voltage generating means, said subtracting means subtracting output signals of said first regulator from said reference voltage values and outputting a set of results of said subtraction;

wherein said power converter receives as input one of said set of results of said subtraction.

2. The variable-speed driving apparatus for an AC motor according to claim 1, wherein said reference voltage generating means generates reference primary voltage values for each phase of the AC motor.

3. The variable-speed driving apparatus for an AC motor according to claim 2, wherein the input signals of said first regulator are said set of output signals generated by said current detectors.

4. The variable-speed driving apparatus for an AC motor according to claim 3, wherein said gain means comprises a plurality of amplifiers which amplify said set of signals representing the detected phase current values transmitted from said current detectors.

5. The variable-speed driving apparatus for an AC motor according to claim 3, wherein said gain means comprises a plurality of differentiators which differentiate said set of signals representing the detected phase current values transmitted from said current detectors.

6. The variable-speed driving apparatus for an AC motor according to claim 4, further comprising:

a second regulator comprising a plurality of differentiators, said differentiators having as input signals said set of signals representing the detected phase current values transmitted from said current detectors, said differentiators differentiating said set of signals representing the detected phase current values;

wherein said subtracting means subtracts output signals of said first and second regulators from said reference voltage values and transmits results of said subtraction to said power converter.

7. The variable-speed driving apparatus for an AC motor according to claim 1, wherein said reference voltage generating means generates a reference primary angular frequency value and reference biaxial voltage values of said AC motor in a rotating orthogonal coordinate system.

8. The variable-speed driving apparatus for an AC motor according to claim 7, wherein the input signals of said first regulator are said set of signals derived from said set of output signals generated by said plurality of current detectors.

9. The variable-speed driving apparatus for an AC motor according to claim 8, wherein said power converter receives as input said set of signals derived from said set of results of said subtraction.

10. The variable-speed driving apparatus for an AC motor according to claim 9, further comprising:

an integrator electrically coupled to said reference voltage generating means, said integrator integrating the reference primary angular frequency value and outputting a corresponding phase value.

11. The variable-speed driving apparatus for an AC motor according to claim 10, further comprising:

a first vector transformer, to which said phase value produced by said integrator is transmitted, said first vector transformer being electrically coupled to said current detectors and transforming said set of signals representing the detected phase current values transmitted from said current detectors into orthogonal biaxial current components.

12. The variable-speed driving apparatus for an AC motor according to claim 11, wherein said first regulator comprises a plurality of amplifiers for amplifying said orthogonal biaxial current components.

13. The variable-speed driving apparatus for an AC motor according to claim 12, further comprising:

a second vector transformer electrically coupled to output side of said subtracting means and input side of said power converter, said second vector transformer transforming said set of results of subtraction by said subtracting means into reference phase voltage values and transmitting the reference phase voltage values to said power converter.

14. The variable-speed driving apparatus for an AC motor according to claim 11, wherein said first regulator comprises:

a plurality of amplifiers and differentiators to which said orthogonal biaxial current components are transmitted;

a multiplier for multiplying output signals from said plurality of amplifiers with said reference primary angular frequency value; and a means for adding and subtracting output signals of said multipliers to and from output signals of said differentiators, output of said adding and subtracting means being the output of the first regulator.

15. The variable-speed driving apparatus for an AC motor according to claim 14, further comprising:

a second regulator electrically coupled to said current detectors, said second regulator in turn comprising a plurality of amplifiers which amplify said set of signals representing the detected phase current values.

16. The variable-speed driving apparatus for an AC motor according to claim 15, further comprising:

a second means for subtracting output signals of said second regulator from said reference phase voltage values generated by said second vector transformer and transmitting results of said subtraction to said power converter.

17. The variable-speed driving apparatus for an AC motor according to claim 13, further comprising a second regulator which in turn comprises:

a plurality of amplifiers and differentiators to which said orthogonal biaxial current components are transmitted;

a multiplier for multiplying output signals from said plurality of amplifiers with said reference primary angular frequency value; and a means for adding and subtracting output signals of said multipliers to and from output signals of said differentiators, output of said adding and subtracting means being the output of the second regulator;

wherein said subtracting means subtracts output signals of said first and second regulators from said reference biaxial voltage values and transmits results of said subtraction to said second vector transformer.

18. The variable-speed driving apparatus for an AC motor according to claim 13, further comprising:

a second regulator electrically coupled to said current detectors, said second regulator in turn comprising a plurality of differentiators which differentiate said set of signals representing the detected phase current values.

19. The variable-speed driving apparatus for an AC motor according to claim 18, further comprising:

a second means for subtracting output signals of said second regulator from said reference phase voltage values generated by said second vector transformer and transmitting results of said subtraction to said power converter.

* * * * *

UNITED STATES PATENT AND TRADEMARK OFFICE
CERTIFICATE OF CORRECTION

PATENT NO. : 5,608,302
DATED : March 4, 1997
INVENTOR(S) : Hidetoshi Umida

It is certified that error appears in the above-indentified patent and that said Letters Patent is hereby corrected as shown below:

Column 4, line 52, "($i_{1s}$" should read --($i_{1a}$--;

Column 9, line 17, "Of" should read --of--;

Column 9, line 55, "($K_1$" should read --($K_{L1}$--.

Signed and Sealed this

Fourteenth Day of October, 1997

Attest:

BRUCE LEHMAN

Attesting Officer          Commissioner of Patents and Trademarks